INVENTORS
RICHARD J. TOBIN, DECEASED,
BY BETTY P. TOBIN EXECUTRIX
AARON BARKMAN
JOEL E. PORT

BY Walter J. Monacelli
ATTORNEY

Oct. 7, 1969        R. J. TOBIN ET AL        3,471,424
APPARATUS AND PROCESS FOR BATCH ESTERIFICATION OF POLYHYDRIC
    ALCOHOLS WITH POLYCARBOXYLIC ACIDS OR INTERMEDIATE
              ESTERIFICATION PRODUCTS THEREOF
Filed Jan. 30, 1967                         2 Sheets-Sheet 2

INVENTORS
RICHARD J. TOBIN, DECEASED,
BY BETTY P. TOBIN, EXECUTRIX
AARON BARKMAN
JOEL E. PORT

BY
Walter J. Monacelli
ATTORNEY

United States Patent Office
3,471,424
Patented Oct. 7, 1969

3,471,424
APPARATUS AND PROCESS FOR BATCH ESTERI-
FICATION OF POLYHYDRIC ALCOHOLS WITH
POLYCARBOXYLIC ACIDS OR INTERMEDIATE
ESTERIFICATION PRODUCTS THEREOF
Richard J. Tobin, deceased, late of Oak Lawn, Ill., by
Betty P. Tobin, executrix, Oak Lawn, Aaron Barkman,
Flossmoor, and Joel E. Port, Olympia Fields, Ill.; said
Barkman and said Port assignors to The Sherwin-Williams Company, Cleveland, Ohio, a corporation of
Ohio
Filed Jan. 30, 1967, Ser. No. 612,741
Int. Cl. C08g *17/003, 17/16*
U.S. Cl. 260—22
15 Claims

ABSTRACT OF THE DISCLOSURE

This invention comprises improved apparatus and process for the batch esterification of polyhydric alcohols with polycarboxylic acids or intermediate esterification products thereof to produce polyester resins which involves directing a sidestream from the main reaction mass through a vaporizer in which the reaction mass in the sidestream is flowed in film form on a heated surface having free space thereabove adapted to permit vaporization of solvent and condensation of water from the sidestream, the said heated surface having a temperature at least 10° F. higher than the main reaction mixture temperature, returning the stream exiting from the vaporizer to the main reactor, thereby cooling this returning stream by mixing with the reaction mass maintained at a lower temperature, the reaction mass in the sidestream being exposed to higher temperature for a relatively short period with accompanying removal of solvent and condensation water and then cooled by re-entry into the main reaction mass so that the reaction rate in the sidestream is increased for short intervals without prolonged exposure to higher temperatures, the solvent vapors emanating from the vaporizer being cooled and separated from condensed water and returned to the main reaction mass to retain the reaction mass at a temperature lower than effected on the sidestream. The main reaction mass is advantageously maintained at a temperature of 150–700° F., and the temperature of the sidestream exiting from the vaporizer having a temperature at least 4° F., preferably at least 20° F. above said main reactor temperature.

Figure 1:
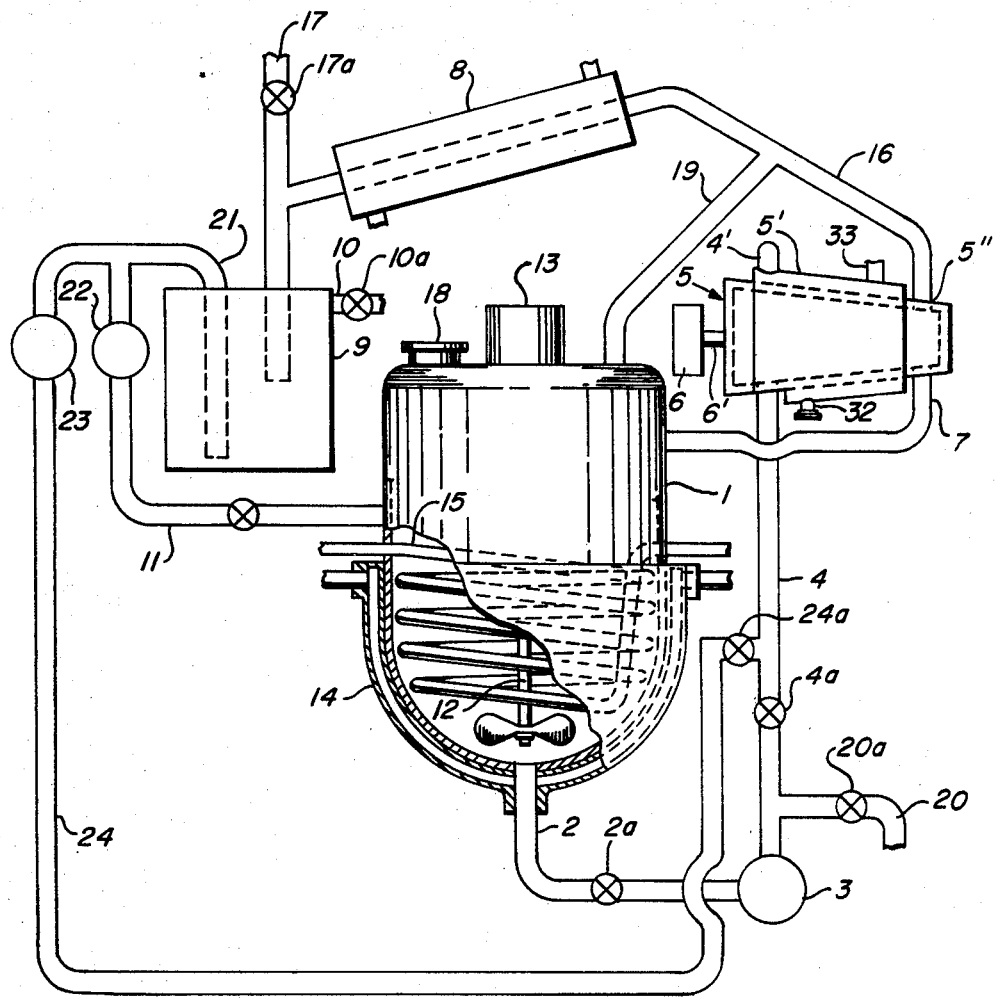

This invention relates to improved apparatus and process for the batch esterification of polyhydric alcohols with polycarboxylic acids, or intermediate esterification products thereof, to produce polyester resins. Moreover, it is also related to similar esterifications modified by monocarboxylic acids and/or monohydric alcohols to produce fluid coatings often referred to as alkyds and oil-modified alkyds. More specifically, this invention relates to a process and apparatus in which a portion of the reaction mass is removed as a sidestream from the main reagent body and heated to a higher temperature for a short period to expedite esterification and removal of condensation water after which the sidestream is returned to the main body of reagents and cooled to the temperature of the main reaction mass.

In the production of polyester resins by the esterification of polyhydric alcohols, such as glycerine, pentaerythritol, trimethylol propane, etc. with polycarboxylic acids, such as phthalic, maleic, fumaric, succinic acids, etc. and their anhydrides, it is generally necessary to conduct the esterification for prolonged periods in order to produce the desired low acid number and resinification. In many cases, this prolonged exposure to the high temperature necessary to expedite the esterification causes some discoloration and degredation of the product. In any case, it is desirable to reduce as much as possible the period required for esterification in order to increase the production capacity and production rate for the esterification equipment, and generally thereby to reduce the cost for producing such resins.

Experiments with batch processes indicate that heating to higher temperatures than normally used with subsequent reduction in temperature will cause esterification at a greater rate than maintaining the reaction mass at a higher temperature. Apparently, equilibrium conditions and degradation side reactions at prolonged high temperatures make it undesirable to maintain the reaction mass at a higher temperature for prolonged periods. However, the raising and lowering of the entire reaction mass temperature in conventional batch equipment is highly impractical because of the larger amount of surface required for heat transfer, and the loss of heat involved in the heating and cooling operations. Likewise, it is not practical in continuous processing because of the number of such steps which are required to reach completion. Experiments have shown that the preparation of an alkyd resin in this manner would require 7 or more steps for completion.

The G. W. Sovereign U.S. Patent 3,218,297 discloses a continuous process for manufacturing polymers, particularly polyamides, starting with aqueous solutions of the salt reactants, passing the reactants through a plurality of thin film evaporators in series first to evaporate the water of solution and then to condense the monomers to produce a fused polymer. Here no solvent is used and the process involves a single-pass, continuous process designed for producing high molecular polyamides in which no solvent is to be present and apparently to yield a fused or melted thermoplastic resin.

British Patent 1,020,191 discloses a process for producing polyesters from dicarboxylic acids and polyhydric alcohols by preheating a mixture of reactants to a relatively high temperature but under conditions such that esterification is at most only partial, that is with substantially no polyesterification taking place. The heating is conducted in a confined zone so that any water formed during the condensation is prevented from escaping from the reaction mixture and then the heated mixture is discharged from the confined zone into a flash zone to permit vaporization of the water and the completion of the esterification reaction.

Birnbaum U.S. Patent 2,875,221, discloses a continuous process for effecting alcoholysis on triglyceride oils to convert the oils to mono- and diglycerides. The patented process and apparatus utilize an atmospheric, solvent-free technique wherein the triglyceride is heated in a tank to about 400–475° F., following which 1–0.33 parts of anhydrous glycerine at a temperature of 275–325° F. and containing 0.1–2% by weight of alkali and 5–10% by weight of a previously prepared mono-glyceride is admixed therewith. The resultant mixture is rapidly applied in film form on a revolving drum at 475–525° F. for a period of 2–8 minutes, following which the mixture is held hot for at least 15 minutes, preferably 20–30 minutes. Then concentrated phosphoric acid is added to react with the alkali, after which the acidified mixture is chilled in less than a minute to 200–300° F. to minimize reversion of the monoglyceride and the product is then filtered.

None of these processes teach polyesterification in the manner of the present invention nor do any of these processes have the advantages of polyesterification pointed out for the present invention.

In accordance with the practice of this invention, it has been found that the desired degree of esterification can be effected in a much shorter period and with certain improved properties in the resultant resin. These improvements are effected by conducting the esterification in equipment and according to a procedure whereby a portion of the reaction mass is removed from the main reactor as a sidestream, heated in film form to a higher temperature and simultaneously exposed to evaporative conditions whereby solvent and the water of condensation are removed before the sidestream is returned to the main reaction mass. Advantageously, the solvent which is removed during this sidestream heating and evaporation is condensed, and the cooled solevent, after separation from the condensation water originally associated with it, is returned to the main reaction mass, thereby maintaining the desired lower temperature in the main reaction mass which cools the sidestream upon its return to the main reactor.

The evaporation or vaporization of solvent and therewith condensation water from the esterification is effected simultaneously with the heating operation so that the esterification reaction is pushed in the desired direction by removal of one of the components that would otherwise tend to promote an equilibrium condition during the heating step. A preferred method of simultaneous heat injection and vaporization is by the use of a thin film heat exchanger and evaporating unit, particularly useful being the type in which the reaction mass is pumped and forced into a thin film about a horizontally positioned cone-shaped rotor positively driven. The thickness of the film is controlled by adjusting the clearance between the periphery of the rotor and the adjacent inner wall of the stator which is jacketed for heat control.

Spreading the reaction mass into a thin film together with the introduction of heat at a fast rate promotes an increase in the reaction rate favored highly by the extensive vaporization surface thus presented. With the increased reaction rate and fast removal of the condensation water by the vaporization effected by this method, the reaction mass need not be exposed to relatively high temperatures for an extended period. The degree of esterification is much greater with this brief exposure to high temperature and accompanying favorable vaporization conditions than is possible when the entire reaction mass is heated to high temperature and the water of condensation removed by normal means. In such latter case, the difficulty and slowness in removing condensation water retards the reaction in view of the building up in concentration of condensation water and the tendency to reach equilibrium conditions as such concentration builds up. Moreover, the rapid vaporization of solvent and condensation water produces a cooling effect which cuts off or reduces the period for which the reaction mass is exposed to high temperatures. Furthermore, the reintroduction of recovered, water-free cooled solvent also aids in cutting short the exposure of the reaction mixture to prolonged heating.

In addition to the thin film type of evaporator described above, it is also possible to effect the process of this invention in other types of equipment in which the reaction mixture in the side-stream can be as quickly heated to the desired temperature and simultaneously and directly thereafter have a substantial amount of the heat removed by vaporization of solvent and condensation water. Thus the increased heat increases the reaction rate and simultaneously forces the esterification in the desired direction by almost immediate removal of condensation water, also effecting cooling by solvent vaporization to prevent prolonged exposure of the sidestream reaction mixture to temperatures substantially above those in the main reaction mass. Thin film heating devices of various types can be used for this purpose with vaporization being permitted during the rapid heating.

The apparatus and process of this invention are best illustrated by reference to the drawings. FIG. 1 shows a reactor 1 equipped with a stirrer 12 driven by motor 13. A manhold 18 at the top of the reactor provides a means for introducing the various reagents. Coil 15 shown in the cutaway section of the reactor provides a means inside of the reactor for effecting heat control of the reaction mixture. The lower portion of the reactor is encased in jacket 14 which also provides an external means for heat control of the reaction mass. Exit line 2 controlled by valve 2a provides a means for withdrawing a sidestream. This sidestream is forced by pump 3 into line 4 which feeds the reaction mixture sidestream into the thin film evaporator 5 which is provided with a heating jacket for the purpose of effecting the heat injection for the high temperature desired in the sidestream. The construction and operation of such a thin film evaporator is illustrated in greater detail in FIG. 2.

Figure 2:
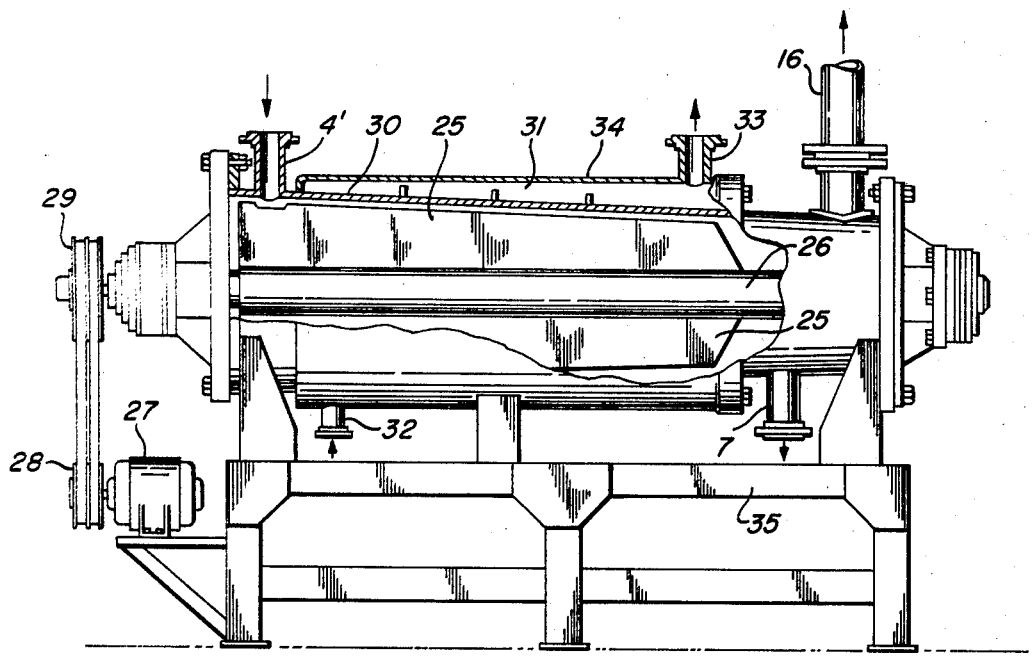

In FIG. 2 the sidestream is fed into the evaporator through inlet 4'. The stream hits the rotor blade 25 which extends from shaft 26 driven by motor 27 through drive wheels 28 and 29. The sidestream liquid is distributed in a thin film on the inner surface of the evaporator wall 30 which is maintained at the desired temperature by oil 31 circulating between the outside of the evaporator wall 30 and the jacket 34. The heated oil for this heating purpose is fed through inlet 32 and out through outlet 33. The heated sidestream liquid is raised in temperature as it advances toward the other end of the evaporator. As condensation water and solvent are vaporized, the resulting vapors pass through vapor outlet 16 and the further esterified reaction mass passes out through outlet 7' and is returned to the main reactor vessel as shown in FIG. 1. The evaporator and motor are supported on base 35.

As the reaction mixture is spread on the rotor in a thin film and advanced from the point of entry to the opposite end of the rotor, the vapors escape through outlet 16 and are cooled in condenser 8. The esterification mixture as it likewise advances to the opposite end of the rotor from the point of entry flows out of the thin film evaporator through exit line 7 and is returned to reactor 1. Vapors from the main reaction mass in reactor 1 escape through vapor exit line 19 and are likewise fed into condenser 8. Any noncondensible gases that accumulate in the system can be vented by opening valve 17a in line 17. If desired this valve can be left open to prevent any pressure build-up in the system.

The condensed solvent and condensation water flow into decanter 9 from which the upper layer of water is drawn off by opening valve 10a in exit line 10. The lower layer of solvent which collects in decanter 9 is withdrawn through line 21, part being pumped by pump 22 back into the main reactor by line 11. Pump 23 forces solvent through line 24 into the sidestream at a relatively cool point in line 4 before the sidestream is fed into thin film heater 5.

In this particular arrangement of equipment, part of the condensed solvent is fed back directly into the cooled sidestream, thereby providing additional solvent for stripping water and cooling by vaporization. The cooling of the sidestream after heating in 5 is effected by the vaporization step and further cooling is effected by reintroduction of the sidestream mixture into the main reagent body which is at a substantially lower temperature. The main reaction mass is cooled somewhat by the reintroduction by line 11 of solvent which has been cooled in condenser 8.

Test samples can be removed periodically through exit line 20 by the opening of valve 20a. When the esterification has progressed to a sufficient degree, the product can be recovered by closing valve 4a and pumping the product out through exit line 20.

In the process of this invention there is no physical limit on the amount of heat that can be added to the sidestream. In the equipment shown in FIG. 1 the limit on the amount of heat that can be added to the sidestream, is a function of the size of the thin film evaporator or heater. In conventional processes only as much heat can be added as can be removed from the batch surface by vaporization of solvent without foaming of the reaction mass up into the condensing equipment. In the thin film evaporation technique the vaporization is effected quickly, efficiently, and with immediate water removal.

However, there is a practical limit to the amount of heat that can be added in the sidestream system. This is a purely economical one in view of the fact that the reduction in esterification time is asymptotic with the increase in energy added. For example, in esterifying a medium oil length soya glyceryl phthalate, the reaction at 460° F. will be essentially complete in 8 hours in conventional batch equipment without the addition of heat above that necessary to maintain this temperature.

When heat is added instead by the process and equipment of this invention to a 200 pound reaction mass at the rate of 27,000 B.t.u./hr., the reaction time is reduced to 3 hours. However, the introduction of an additional 60,000 B.t.u./hr. reduces the reaction time only by about 1 hour. Consequently, the introduction of the first 27,000 B.t.u./hr. effects a reduction in time by about 5 hours, whereas the additional 60,000 B.t.u./hr. introduction effects only 1 hour additional reduction in time. Therefore, economics dictate a practical limit on the heat to be introduced in the sidestream in accordance with the saving in time which will be effected by the amount of heat added.

It has been found that the reduction in esterification time is dependent upon the overall heat input into the system and this is more or less independent of the particular temperature to which the sidestream is heated. For example, if in the system referred to above, the 27,000 B.t.u./hr. heating rate is applied to the sidestream for a 200 pound reaction mass, the reaction time to produce the desired degree of esterification is still 3 hours regardless of whether the heat introduction is effected by:

(a) Effecting a temperature rise of 80° F. in a 600 pound hour sidestream, or (b) Effecting a temperature rise of 20° F. in a 2,400 pound per hour sidestream.

As will be noted, in both cases 27,000 B.t.u./hr. will be introduced per hour. Although the esterification time is the same in both cases, the color of the product produced by the cooler sidestream is lighter by visual comparison. It is also pertinent to note that the amount of solvent vaporized was the same in both of these processing operations.

The minimum heat input of the system for the purpose of this invention is advantageously at least 20 B.t.u., preferably 60 B.t.u. per hour per pound of reaction mass (not including the solvent). Below 20 B.t.u. the rate improvement does not provide any economic advantage to a system of this type. While as high as 400 B.t.u. per hour per pound can be regarded as still within the practical range, it is generally preferred to have no more than 280 B.t.u. per hour per pound of reactants, depending on the transfer coefficients and the design of the particular unit used.

With variations in the heat input within the range indicated above, there will be variations in the rate of reflux. The rate of solvent return to the system is also dependent on the rate of heat addition and the rate at which evolved water assists in removing heat. In accordance with the minimum heat input rate, a reflux rate of at least 0.00005 gallon per minute per pound of reactant, or preferably 0.0003 gallon per minute per pound of reactant is required. This reflux can be entirely in the reaction vessel, entirely in the sidestream, or divided in any proportion between the reaction vessel and the sidestream. Generally, however, it is preferred to have between 20% and 50% of the heat input removed by the solvent vaporization in the sidestream.

For this purpose, additional solvent is generally added to the sidestream before it enters the evaporator. If the solvent is xylene, a maximum of 0.006 gallon per minute per pound of reactants is desirable. However, if a solvent is used with a lower latent heat, a reflux of 0.012 gallon per minute per pound is more desirable.

Normally the temperature of the sidestream entering the evaporator is very nearly that of the reactor temperature as it exits from the unit. When the evaporator is heated by the circulation of hot oil in the heat exchanger, the temperature of the oil can be as low as 10° F. higher than the temperature of the reactor, but is generally at a temperature of 600° F.–800° F., preferably 600° F.–650° F. This oil temperature can be automatically controlled in accordance with the temperature of the reaction sidestream as it exits from the evaporator. The residence time of the reaction mass in the evaporator can be as little as one second and preferably 5–60 seconds and as long as 5 minutes. Below one second, the flow rate is extremely high, and long residence times result in uneconomic under-utilization of the equipment as well as undesirably long exposure to the higher temperatures.

The temperature differential between the reaction mass in the reactor and is the sidestream where it leaves the evaporator depends on the rate of heat input and the sidestream circulation rate. Low circulation rates with high residence time and as high as 240° M. differential can be used in contrast with high circulation rates, low residence time, and as little as 20° F. differential can be used. The difference in reaction time is not significant so long as the heat input rate is the same.

However, operating in the lower temperature ranges produces the lightest color in the product. If extremely high circulation rates are economically feasible, temperature differentials as low as 4° F. are practical. This means that with a minimum temperature of 150° F. in the reactor, the effluent from the evaporator can have a temperature as low as 154° F., particularly where reduced pressure may be employed. Generally, however, it is desirable, in order to have a faster reaction rate, that this effluent temperature is at least 320° F. and it is generally desirable not to exceed 800° F.

Polycarboxylic acids or their anhydrides that can be used in preparing polyesters in accordance with this invention include maleic, itaconic, fumaric, chlorendic, cis-endomethylene, tetrahydrophthalic, succinic, sebacic, phthalic, isophthalic, terephthalic, adipic acids, etc. and their anhydrides. In some instances, these may be modified by monocarboxylic acids or their anhydrides, such as acetic, stearic, oleic, linoleic, linolenic, benzoic, naphthoic, phenylacetic, etc.

The polyhydric alcohol can be glycerine, trimethylolethane, trimethylolpropane, pentaerythritol, propylene glycol, ethylene glycol, diethylene glycol, triethylene glycol, neopentyl glycol, tetraethyleneglycol, butylene glycol, dipropylene glycol, hexamethylene glycol, etc.

The polyhydric alcohol and the polycarboxylic acid can be used in the monomeric form or the reaction can be initiated with partially condensed starting materials such as obtained by the alcoholysis of a drying oil. For example, a drying oil such as linseed, soya, etc. can be heated with glycerine, pentaerythrital, etc. with or without an alcoholysis catalyst such as lead soyate, etc., at about 400–450° F.

This alcoholized oil or intermediate polyester can then be further reacted with a polycarboxylic acid such as phthalic acid or anhydride to produce the resin product. This procedure is in accordance with known commercial practice, and various other oils, polyhydric alcohols and polycarboxylic acids can be used for this purpose.

Oils that can be used to produce suitable alcoholyzed oils are drying oils, semidrying oils, and nondrying oils. These are alcoholyzed with any of the polyhydric alcohols listed above. Typical of these oils are linseed, soybean, chinawood, tall, corn, perilla, rapeseed, cottonseed, oiticia, dehydrated caster oils, etc.

As indicated herein, the temperature in the sidestream is not a critical factor but preferably there is a higher temperature in the film evaporator than in the main reactor so as to speed up the polyesterification period. Also, advantageously, there is a maximum temperature in the sidestream depending upon the particular type of oil and its stability at the temperature being used, the residence time in which the sidestream is to be exposed to this temperature, etc. Therefore, the sidestream temperature can be as low as 4° F., preferably 20° F. above the reactor temperature and as high as 600° F. or even up to 700° F. depending on the use of pressure and depending upon the particular polyester and whether the color of the polyester product is not critical. Generally, however, it is preferable to have the effluent from the film evaporator at a temperature in the range of 450–550° F. This temperature is rapidly reduced upon reentry of the sidestream into the main reactor, either above or below the level of the reaction mass therein.

Generally, all of the heat for the reaction effected according to this invention is conveyed through the thin film heat exchanger. Heat control can also be effected in the main reactor by either or both the interior or exterior heat exchange means. In a heat exchanger such as described herein, hot oil can be circulated as low as 10° F. above the reactor temperature or as high as 800° F., but preferably in the range of 600–650° F. However, most of the control in cooling is effected by the addition of cooled solvent either by refluxing or by recirculation. Preferably the process is run at atmospheric pressure although reduced pressure and superatmospheric pressures can be used with appropriate adjustments.

While reference is made above to the cooling of the effluent from the film evaporator by returning it to the main reaction mass, it is considered equivalent although not as desirable for the purpose of this invention to effect such cooling before reentry, for example by introducing cooled solvent, passing through a heat exchanger, etc. The important point is that the stream is not exposed any longer than necessary to the high temperatures at which it exits from the film evaporator. The most practical way of effecting this is by mixing it with the main reaction mass which is at a lower temperature.

Moreover, while reference is made to cooled condensed solvent being "returned" to the reaction mass for maintaining the lower temperature in the reactor, it is considered equally satisfactory to introduce cool replacement solvent for this purpose.

This invention is best illustrated by the following examples. The invention is not to be regarded, however, as restricted in any way by these examples and they are to serve merely as illustrations. In these examples and throughout the specification, "parts" and "percentages" are given by weight unless specifically provided otherwise.

Example 1

In equipment similar to that shown in FIG. 1, 57.5 parts of alkali-refined soya oil and 57.5 pounds of linseed oil are charged to a 30 gallon reactor. This oil mixture is circulated to the evaporator 5 until it is heated to 350° F. With the hot oil heating media in jacket 5' at 600° F., this requires about 15 minutes. The evaporator 5 has 4 sq. ft. of heated and scraped transfer surface, and transfers approximately 200 B.t.u./sq. ft. per degree F. at the circulation rate and with the materials used in this example. With the oil at a temperature of 350° F., 29.3 lbs. of pentaerythritol are added along with 310 grams of lead soyate catalyst to promote alcoholysis. The circulation is continued at a rate of 40 lbs. per minute throughout the reaction. When the temperature of the oil has reached 450° F. the alcoholysis is complete as determined by phthalic anhydride compatibility. This is effected within 14 minutes from the time of the pentaerythritol addition. Then 56.6 pounds of phthalic anhydride are added and the temperature allowed to rise to 480° F. in the main reactor 1. Xylene is allowed to flow from the decanter 9 into the side stream in line 4 at a rate of 0.08 gallon per minute. The controls on the heating media flow to the evaporator are set to maintain the evaporator outlet temperature at 500° F. The flow of solvent to the reactor 1 is manually adjusted to maintain a constant temperature in the reactor of 480° F. The condenser 8 is a 10 sq. ft. water-cooled shell and tube condenser. The water is decanted from the solvent and the solvent layer is recycled at a temperature of approximately 100° F. These esterification conditions are maintained until the resultant alkyd resin has reached the desired state of polymerization indicated by an acid value of 6.5, a Gardner-Holt viscosity of "X" at 50% dilution with mineral spirits, and a cure of 20 seconds. The heat input to this material during the esterification reaction is maintained at approximately 33,000 B.t.u./hr. The esterification time for this particular resin is 3 hours and 36 minutes, with a total cooking time of 4 hours and 5 minutes. The color of the product is 5 on the Hellige scale. When the identical batch is processed in conventional batch type equipment, the total time required is 8 hours, compared to 4 hours and 5 minutes in the present equipment, and the product has a color of 8 on the Hellige scale as compared to 5 in the present invention.

Example II

Using the procedure and equipment of Example I, 59 pounds of propylene glycol is charged and heated to a temperature of 325° F. by circulation through the evaporator. When the glycol reaches this temperature, 53.2 pounds of phthalic anhydride and 35.2 pounds of maleic anhydride are added. Xylene is allowed to flow from decanter 9 into the sidestream in line 4, at a rate of .08 gallon per minute. For this reaction, vapor line 19 is provided with a jacket and cooled to 240° F. by a flow of steam at atmospheric pressure. This propylene glycol condensed by this cooling is trapped below the jacket and conducted to the inlet of pump 23 for recirculation through line 24. The temperature of the reactants in vessel 1 is allowed to rise to 390° F. and maintained there by controlling the return of xylene through line 11. The hot oil to the evaporator is controlled at 600° F. The rate of circulation of reactants through the evaporator is 40 lb. per minute. The temperature of the reactants at the outlet of the evaporator is controlled at 410° F. These conditions are maintained until the polyester reaches the desired degree of polymerization indicated by an acid value of 40, and a Gardner-Holt viscosity of "T." the xylene remaining in the resin is removed by stopping the flow in lines 24 and 11 and continuing the circulation through the evaporator. The flow of hot oil is stopped to avoid raising the temperature of the resin. When the xylene removal is complete as indicated by the cessation of condensate flow, the resin is cooled by running water through jacket 14 and cooling coil 15 down to 300° F. The cooled resin is pumped from the reaction system into an agitated mixing tank containing 55 lbs. of styrene and 13 grams of tertiary butyl hydroquinone to inhibit formation of polystyrene. The batch is processed in 5½ hours as compared to 9½ hours in conventional equipment.

Example III

Using the process and equipment of Example I, 102.5 pounds of soya oil and 7.75 pounds of glycerine are charged and heated to 350° F. Twenty-seven pounds of pentaerythritol and 250 grams of lead soyate catalyst are added and the mixture heated to 450° F. This requires a total of seventeen minutes using hot oil at 600° F. The temperature of the reactants is maintained at 450° F. until the alcoholysis reaction is complete. This requires thirteen minutes. At this time 56.25 pounds of phthalic anhydride and 6.5 pounds of benzoic acid are added. The solvent flow is started to the evaporator at a rate of .08 g.p.m. The heating oil flow is controlled to maintain a temperature of 480° F. in the recirculation stream leaving the evaporator. This recirculation flow is pumped at 40 lb./minute. Solvent is added to the batch tank at a rate which controls the temperature at 460° F. Under these processing conditions, the rate of heat input is approximately 32,100 B.t.u./hr. and the polyesterification requires 7 hrs. for a total processing time of 7½ hrs. as compared to 12¾ hrs. in conventional equipment.

Example IV

The procedure of Example III is repeated, except that the rate of recirculation of the reactants is reduced to 10 lb./minute which at the temperatures of Example III is equivalent to a heat input rate of 11,900 B.t.u./hr. during the polyesterification. The processing requires 8.3 hours with this reduced input of heat.

Example V

The process of Example IV is repeated, except that the flow of heating oil to the evaporator is controlled to maintain an outlet temperature of 570° F. in the recirculation stream at the outlet from the evaporator. At this higher temperature, the heat input rate of the process was 42,100 B.t.u./hr. during the polyesterification. The processing requires 4.8 hours at this level of heat input.

Example VI

Using the procedure and equipment of Example I, 150 lbs. of linseed oil is charged and heated to 400° F. Ten pounds of pentaerythritol and 240 grams of lead soyate catalyst are added and the mixture is further heated to 460° F. where it is maintained until the alcoholysis reaction is complete. The heating is accomplished by circulating through the oil-heated evaporator at a rate of 40 lbs./minute. Then 8.9 lbs. of fumaric acid and 31 lbs. of rosin are added and the mixture cooled to a temperature of 370° F. by introducing cold water into the vessel jacket and stopping the flow of heating oil to the evaporator. This is done to control the rate of release of the exothermic heat of reaction. The flow of solvent to the recirculation stream is then started at a rate of .08 g.p.m. After a period of ½ hour, the flow of heating oil is resumed at a rate which controls the temperature of the recirculation stream at 560° F. These conditions are maintained until the resin attains the desired characteristics. The total time required to process this resin under these conditions is 6.5 hours as compared to 15 hours in conventional equipment.

Example VII

Using the procedure and equipment of Example I, eighty-two pounds of linseed fatty acids and 9.6 lbs. of tung oil are charged into the batch vessel and heated to 300° F. Fifty-eight pounds of phthalic anhydride are added and then 47.8 lbs. of trimethylolethane. The temperature is raised to 325° F. and 2.6 lbs. of phenolic resin are added. The temperature is raised to 490° F. and a solvent flow of .08 g.p.m. is started to the evaporator. The heating oil flow is set to control the recirculation stream at 520° F. The temperature of the mixture in the vessel is controlled at 490° F. by addition of solvent. These conditions are maintained until the desired characteristics are attained. This resin requires a total processing time of 6 hours as compared to 18 hours in conventional equipment.

Similar results are obtained when the other polycarboxylic acids and anhydrides, polyhydric alcohols and oils listed above are substituted for those used in the preceding examples.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A method for producing polymeric polyesters comprising the steps of:
    (a) admixing in a reactor reagents appropriate for forming the polyester selected from the class consisting of polyols, polycarboxylic acids and intermediate polyester reaction products thereof in an inert volatile organic solvent immiscible with water;
    (b) maintaining said reaction mixture at a temperature in the range of 150° to 700° F.;
    (c) withdrawing from said reactor a stream of the reaction mixture therein and passing said stream through a heat exchanger adapted to have said stream flow in film form on heated surface having free space thereabove and adapted to permit vaporization from said film of said solvent and condensation water formed in said polyesterification, said heated surface being maintained at a temperature of 212° to 800° F., and at least 10° F. higher than said reaction mixture temperature;
    (d) returning the stream exiting from said heat exchanger to the main body of reaction mixture in said reactor and thereby cooling said returned stream by mixing said stream with said reaction mass maintained at said lower temperature;
    (e) passing the vapors from said heat exchanger to a condenser whereby said solvent and said water in said vapors are cooled and condensed;
    (f) separating said cooled solvent from said water and returning at least a part of said cooled solvent to said main reaction mass thereby cooling said main reaction mass and the reaction mixture stream being returned thereto; and
    (g) continuing said withdrawing and recycling of said stream until the polyesterification produced thereby reaches the desired acid value and viscosity.

2. The process of claim 1 in which at least a part of said cooled solvent is fed into the stream being withdrawn from said reactor prior to the entry of said stream into said heat exchanger, whereby said added solvent is available for vaporization as said stream passes through said heat exchanger.

3. The process of claim 1 in which the temperature of the effluent from said heat exchanger is not less than about 154° F. and not more than about 800° F.

4. A process of claim 3 in which said temperature is not less than about 320° F.

5. A process of claim 1 in which said reagents comprise alcoholyzed oil and a dicarboxylic acid.

6. A process of claim 1 in which said reagents comprise an unsaturated fatty oil alcoholyzed with pentaerythritol and phthalic anhydride.

7. A process of claim 1 in which said reagents comprise an unsaturated fatty oil alcoholyzed with glycerine and phthalic anhydride.

8. A process of claim 1 in which said reagents comprise dehydrated castor oil alcoholyzed with pentaerythritol and phthalic anhydride.

9. A process of claim 1 in which said reagents comprise dehydrated castor oil alcoholyzed with glycerine and phthalic anhydride.

10. A process of claim 1 in which said reagents comprise chinawood oil alcoholyzed with pentaerythritol and phthalic anhydride.

11. A process of claim 1 in which said reagents are linseed oil alcoholyzed with pentaerythritol and maleic anhydride.

12. The process of claim 1 in which the temperature differential between said reactor and the effluent from said exchanger is not less than 4° F.

13. The process of claim 1 in which the temperature differential between said main reactor and the effluent from said exchanger is not less than 20° F.

14. Apparatus for the batch production of polyesters which comprises:

(a) a reactor vessel having a stirring means, a reagent inlet means, a means for withdrawing a stream of reaction mass, a solvent inlet means, a vapor outlet means, and a means for effecting intimate mixture of the components in said reaction mass;

(b) a heat exchanger adapted to provide high rate of heat transfer to liquid films flowing over heated surfaces in the interior of said heat exchanger, said heat exchanger having vapor space above said heated surfaces adapted to receive and withdraw vapors emanating from the resultant heated film, and said heat exchanger having a vapor outlet means and a liquid outlet means;

(c) a first conduit connecting said reactor vessel and said heat exchanger and adapted to convey said stream of reaction mass into said heat exchanger;

(d) a second conduit connecting the liquid outlet means of said heat exchanger with the interior of said reactor vessel;

(e) a condenser adapted to cool and condense vapors from said heat exchanger;

(f) a third conduit connecting said vapor outlet means of said heat exchanger with said condenser;

(g) a decanter connected to and adapted to receive the condensate from said condenser and to effect separation of the water in said condensate from the cooled solvent; and (h) a conduit adapted to return at least a portion of said cooled solvent to said main reactor.

15. The apparatus of claim 14, in which a fourth conduit is connected to said decanter and adapted to flow solvent from said decanter to said first conduit and into the stream of reaction mass prior to its entry into said heat exchanger.

References Cited

UNITED STATES PATENTS

| | | | |
|---|---|---|---|
| 2,875,221 | 2/1959 | Birnbaum | 260—410.7 |
| 3,039,980 | 6/1962 | Mallison | 260—75 |
| 3,118,739 | 1/1964 | Atkinson et al. | 260—75 |
| 3,218,297 | 11/1965 | Sovereign | 260—78 |
| 3,325,428 | 6/1967 | Graver et al. | 260—75 |
| 3,330,809 | 7/1967 | Perlowski et al. | 260—75 |

DONALD E. CZAJA, Primary Examiner

R. W. GRIFFIN, Assistant Examiner

U.S. Cl. X.R.

23—252, 260, 290; 260—26, 33.6, 75

UNITED STATES PATENT OFFICE
CERTIFICATE OF CORRECTION

Patent No. 3,471,424              Dated October 7, 1969

Inventor(s)  R. J. Tobin et al

It is certified that error appears in the above-identified patent and that said Letters Patent are hereby corrected as shown below

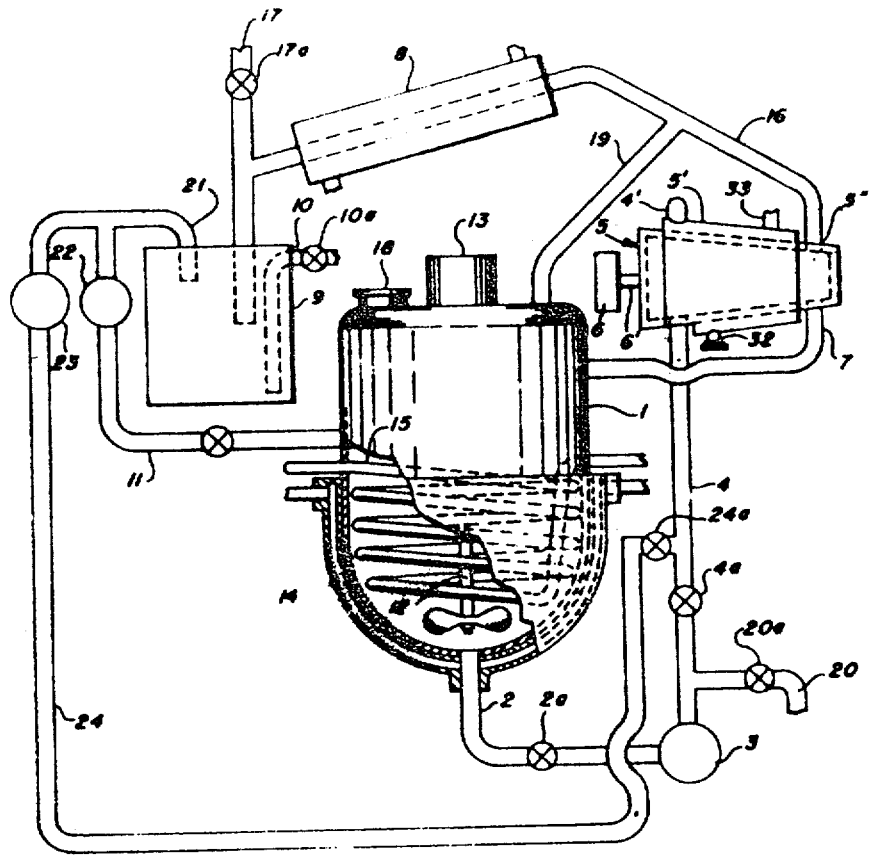

Fig. 1

PO-1050
(5/69)

UNITED STATES PATENT OFFICE
CERTIFICATE OF CORRECTION

Patent No. 3,471,424      Dated October 7, 1969

Inventor(s) R. J. Tobin et al      PAGE 2

It is certified that error appears in the above-identified patent and that said Letters Patent are hereby corrected as shown below:

A new drawing for Fig. 1 is submitted herewith in which elements 21 and 10 are the only modifications from the original drawing. Line 21 is shortened in its extension into decanter 9 and an extension of exit line 10 is added to reach into the lower region of decanter 9.

In Column 2, line 1, correct "degredation" to read -- degradation --.

In Column 3, line 11, correct "solevent" to read -- solvent --.

In Column 4, line 46, correct "upper" to read -- lower --; same column, line 47, correct "lower" to read -- upper --.

In Column 6, line 21, correct "is" to read -- in --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents